United States Patent Office 3,661,914
Patented May 9, 1972

3,661,914
DERIVATIVES OF 5,6-DIHYDRO-PHENANTHRIDINE
Willem Jacob van der Burg, Heesch, Netherlands, assignor to Organon Inc., West Orange, N.J.
No Drawing. Filed July 1, 1969, Ser. No. 838,732
Claims priority, application Netherlands, Aug. 21, 1968, 6811947
Int. Cl. C07d 39/02
U.S. Cl. 260—287 R          2 Claims

ABSTRACT OF THE DISCLOSURE

Novel phenanthridine derivatives having the general formula:

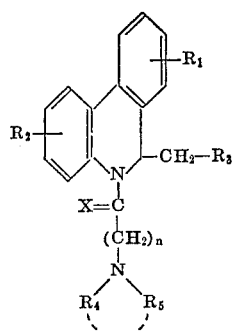

in which $R_1$ and $R_2$ are a member of the group consisting of hydrogen, halogen, hydroxy, amino, acyloxy, alkyl and alkoxy with 1-6 C-atoms.
$R_3$ is a member of the group consisting of hydrogen, hydroxy, alkoxy, and alkyl with 1-6 C-atoms, and halogen,
X is a member of the group consisting of hydrogen ($H_2$) and oxygen,
$(CH_2)_n$ is a member of the group consisting of a branched and an unbranched alkylene group with 1-6 C-atoms,
$R_4$ and $R_5$ are a member of the group consisting of hydrogen and an alkyl group with 1-6 C-atoms, and together with the nitrogen atom a member of the group consisting of a saturated and an unsaturated heterocyclic ring system, and the acid addition salt and quaternary ammonium compounds thereof.

---

The invention relates to novel 5,6-dihydro-phenanthridine derivatives and their preparation.

More particularly the invention relates to new phenanthridine derivatives characterized by the general formula:

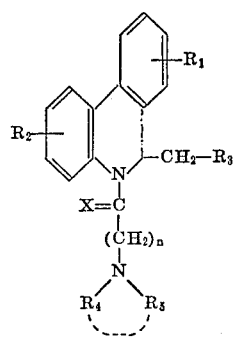

in which $R_1$ and $R_2$=hydrogen, halogen, hydroxy, amino, acyloxy, lower alkyl or lower alkoxy groups,
$R_3$=hydrogen, hydroxy, alkoxy or alkyl with 1-6 C-atoms, or a halogen group,
X=hydrogen ($H_2$) or oxygen,
$(CH_2)_n$=a branched or unbranched alkylene group with 1-6 C-atoms, and
$R_4$ and $R_5$=hydrogen or an alkyl group with 1-6 C-atoms, or together with the nitrogen atom a saturated or unsaturated heterocyclic ring system, and functional derivatives thereof, such as the acid addition salts and quaternary ammonium compounds.

The compounds according to the invention are derivatives of 5,6-dihydro-phenanthridine and are numbered as follows:

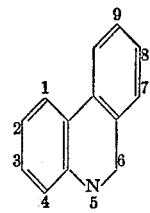

The compounds according to the invention have an antidepressive, an anti-ulcer and an antiserotinic activity, and they can be administered both orally and parenterally, for example, intramuscularly or intravenously. They can be compressed into tablets with auxiliaries, but they can also be used in solutions or suspensions as injection preparations.

The compounds according to the invention can be prepared by any method known for such compounds.

They can be prepared best by starting from a compound of the general formula:

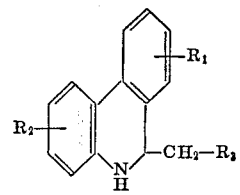

II in which $R_1$, $R_2$ and $R_3$ have the meaning indicated above.

The preparation of the compounds according to Formula II to be applied as starting products can take place in various manners. These starting products can be prepared starting from O-biphenylamine, in which the phenyl groups are substituted or not substituted. By an acylation reation of the amino group with a compound of the type

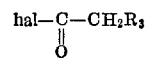

in which $R_3$ has the meaning indicated above, or by aminolysis of the corresponding ester with O-biphenylamine the following compound is obtained of the general formula:

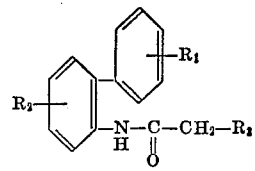

III after which this compound is converted into the corresponding tricyclic compound of the general formula:

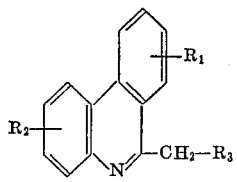

in which $R_1$, $R_2$ and $R_3$ have the meaning indicated above, by heating it with phosphorpentoxide, phosphoroxychloride, polyphosphoric acid, polyphosphoric acid esters or a mixture of 2 or more of these products.

By reduction of the 5,6-double bond a compound according to Formula II is finally obtained. This reduction can be performed by means of the conventional reducing agents. Very suitable are hydrides such as an alkali metal aluminium hydride or an alkali metal boron hydride, diboran or diisobutyl aluminium hydroxide, but catalytic hydrogenation gives excellent results also. As a catalyst substances such as platinum, palladium, Raney nickel or Adams catalyst (platinum oxide) can be used.

Before or after the reduction it is possible to change the group $R_3$. If, for example, $R_3$ is a hydroxyl group, this group can be easily converted either before or after the reduction into, for example, an alkoxy group, by etherification, or into a halogen, by halogenating agents such as $PCl_5$, $SOCl_2$ and $PBr_3$. It is also possible to convert a chloro group into an alkoxy group, for example by means of a reaction with the corresponding alkali metal alcoholate, such as sodium methanolate.

An other method of preparation consists in that substituted or not substituted O-diphenylamine is acylated by means of the compound:

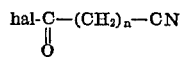

after which ring closure is effected by means of phosphoroxy chloride, polyphosphoric acid or esters thereof. The resulting cyanide is converted into the corresponding carboxylic acid by hydrolysis, after which the acid group can be esterified or reduced to the corresponding hydroxy group.

The starting substance II can also be prepared starting from the compound of the general formula:

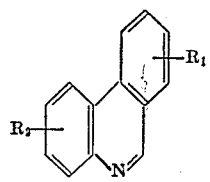

By means of a Grignard reaction this compound can be converted into a compound according to Formula II. Thus, for example, a compound according to Formula V can be reacted with $C_2H_5MgX$, in which X represents a halogen. After hydrolysis a compound according to the general Formula II is obtained, in which $R_3$ represents a methyl group. Starting from compounds of Formula II the compounds according to the invention can be prepared best by coupling the desired substituent to the nitrogen atom in the 5,6-dihydro-phenanthridine molecule.

Thus, by condensation of a compound II with

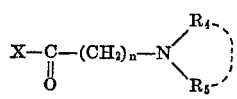

in which $(CH_2)_n$, $R_4$ and $R_5$ have the meaning indicated above, and X represents a group which can be easily split off in a coupling reaction, a compound according to the invention is directly obtained.

If X represents for example a halogen, coupling can be effected in an alkaline medium such, for example, as pyridine and quinoline.

If X represents a hydroxy group, coupling can take place by means of dehydrating agents such as carbodiimides.

If X represents an —OR, in which R is a hydrocarbon radical, condensation can take place by removal of the alcohol which is liberated during the reaction, by distillation. Further the group

may for example also represent anhydrides.

In certain cases, however, the following reaction is preferred, in which the starting substance II reacts with the compound

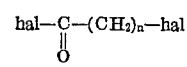

in which hal represents a halogen group and $(CH_2)_n$ a branched or unbranched alkylene group with 1-6 C-atoms, by condensation in an alkaline medium, in which reaction hydrohalic acid is liberated and immediately bound in the alkaline medium, for example, to pyridine.

The compounds obtained in this manner can be converted by conventional chemical methods into the desired compounds according to Formula I. One of these methods consists in reaction the compound obtained with:

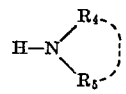

Another method of preparation is the condensation of the starting substance according to Formula II with the compound

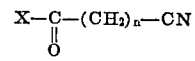

Then the desired compound according to the invention can be obtained by catalytic reduction of the cyanide group.

Either before or after the substitution of the desired group at the nitrogen atom (in the ring) the group $R_3$ (see Formula I or II) can still be changed by any conventional chemical method. If the groups $R_4$ and/or $R_5$ represent hydrogen, they can be converted into alkyl groups in the conventional manner for such reactions after the condensation reaction described above.

The term saturated or unsaturated heterocyclic ring system formed by the group:

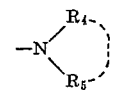

must be understood to mean groups such as piperidine, imidazole, piperazine, pyrrole, pyrrolline, pyrrolidine and morpholine.

The invention also comprises the N-amino-alkyl compounds (see Formula I, in which X is hydrogen), which can be obtained by reduction of the corresponding acyl compound. This reduction can be performed by means of the conventional reducing agents suitable for such conversions. Very suitable are, for example, diboran and hydrogen, the latter in the presence of, for example, platinum, Raney nickel or Adams catalyst.

The desired branched or unbranched amino-alkyl group can also be obtained, however, by direct substitution at the nitrogen atom. Thus, for example, starting from a compound of Formula II, the desired substance can be obtained by a condensation reaction with:

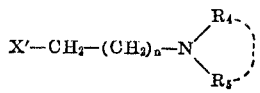

in which X' can represent groups that readily split off in such a condensation reaction.

Thus, X' can represent a halogen, in which case it is preferred, however, to replace the hydrogen atom bound at nitrogen in Formula II, by sodium or an —MgX group, in which X is halogen prior to the condensation reaction.

X' can also be a hydroxyl group, in which case the condensation takes place by means of a reagent promoting the condensation, for example a dehydrating agent such as dicyclohexyl carbodiimide or another carbodiimide.

Another method of preparation consists in condensing of compound according to Formula II with hal—$(CH_2)_n$—CN in which hal represents a halogen, followed by catalytic reduction of the cyanide group. In some cases the condensation reaction can be performed by means of a compound of the formula hal—$CH_2$—$(CH_2)_n$—hal, in which hal represents a halogen, in which case also a reaction is required with:

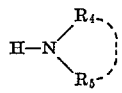

after condensation.

A very simple method of preparation consists in a condensation reaction of a compound according to Formula II with

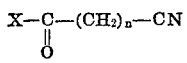

in which X represents a group as indicated on pages 4 and 5. The desired amino-alkyl compound according to the invention can be obtained by reducing the keto and cyanide groups simultaneously.

In this reaction, too, the $R_3$ group can be modified either before or after the condensation by conventional methods. The groups $R_4$ and/or $R_5$ can also be alkylated after the condensation reaction if they represent hydrogen.

The invention also comprises the functional derivatives of the compounds according to the invention (Formula I). By conventional derivatives are understood the acid addition salts and the quaternary ammonium compounds.

By acid addition salts are meant the salts derived from pharmacologically acceptable inorganic acids, such, for example, as hydrochloric acid and phosphoric acid, and organic acids, such as acetic acid, tartaric acid, citric acid, ascorbic acid, gluconic acid, lactic acid, fumaric acid, maleic acid, succinic acid, aspartic acid and glutamic acid.

The quaternary ammonium compounds are obtained by reacting a compound according to Formula I with an alkyl halide, preferably methyliodide.

It will be understood that the present invention comprises both racemic mixtures and the steric isomers resulting from the carbon atom in the 6-position in the phenanthridine ring.

The following examples serve to illustrate the process according to the invention.

EXAMPLE I (a) Preparation of N-acetyl-2-phenylaniline

O-biphenylamine (82.5 gm.) is dissolved in 440 ml. dry benzene. Then 40 ml. pyridine is added. The solution is cooled down to about 8° C. Then 40 gm. acetylchloride is added with constant stirring, maintaining the temperature of 10–12° C. After stirring for another hour at room temperature 50 ml. $H_2O$ is added to the mixture. Then the mixture is shaken for 30–60 minutes. Then the mixture is filtered over activated carbon and benzene and water layers are separated. The benzene layer is washed with water until neutral reaction of the solution and then dried on sodium sulphate (anh.). Then the benzene extract is evaporated to dryness and the resulting crystalline mass recrystallised from alcohol to obtain N-acetyl-2-phenyl-aniline. Yield: about 60%. Melting point: 118–120° C.

(b) Preparation of 6-methylphenanthridine

Polyphosphoric acid (592 gm.) is heated to 120° C., after which 105 ml. phosphoroxy chloride is slowly added and then 60 gm. N-acetyl-2-benzylaniline. The temperature of the mixture is maintained at 120° C. for 2 hours with constant stirring, after which the reaction mixture is poured on ice and neutralized by means of concentrated or solid alkali hydroxide. Then the mixture is extracted with benzene. The benzene extract is washed with water and dried on sodium sulphate and then evaporated to dryness. The residue is recrystallised from ethanol. Yield: about 60%. Melting point: 80–81° C.

(c) Preparation 5,6-dihydro-6-methylphenanthridine

To a mixture of 250 ml. dry tetrahydrofuran hereinafter referred to as THF and 18 gm. $LiAlH_4$ is added while stirring 33 gm. methylphenanthridine dissolved in 250 ml. THF. Then the mixture is refluxed for 24 hours. The whole reaction is performed in nitrogen atmosphere.

Then 75 ml. water is added, after which the mixture is stirred for 1–2 hours. Then the reaction mixture is filtered off and evaporated to dryness. The residue is processed further without further purification.

(d) Preparation 5 N-chloroacetyl-5,6-dihydro-6-methylphenanthridine

Thirty gm. dihydro methylphenanthridine is dissolved in 130 ml. dry benzene, after which 15 ml. pyridine is added. The mixture is cooled down to about 8° C., after which a solution of 15 ml. chloroacetyl chloride in 120 ml. dry benzene is slowly added. During the addition of the latter solution the temperature may not rise above about 12° C. Then the reaction mixture is stirred for 1 hour at room temperature. After the addition of 90 ml. water the mixture is shaken for about 1 hour and then filtered over activated carbon. Then the benzene layer is separated from the water layer. The benzene layer is washed with water until neutral reaction of the solution, after which drying takes place on sodium sulphate. After evaporation and chromatography over a column of silicagel the substance is finely obtained as a clear yellow oil which is immediately processed further.

(e) Preparation 5 N-methylaminoacetyl-5,6-dihydro-6-methylphenanthridine

Eleven grams N-chloroacetyl-methylphenanthridine is dissolved in 200 ml. methanol, after which 200 ml. of a 40% solution of methylamine in methanol is added. The reaction mixture is left to stand for 4 days at room temperature, after which it is evaporated. The residue is dissolved in ether/benzene (50%), after which it is extracted with water to obtain a precipitate. The water layer with the precipitate is separated from the ether/benzene layer. Then so much alkali hydroxide is gently added to the water layer that no more precipitate forms. This mixture is extracted 3× with ether. The ether layers are collected and dried on sodium sulphate, after which they are evaporated to dryness. Yield of N-methylaminoacetylmethyl phenanthridine: 85%. This product is immediately converted into the HCl salt.

(f) Preparation of the HCl salt

The quantity of N-methylaminoacetyl-6-methylphenanthridine obtained (9.3 gm.) is dissolved in so much ether as required for this purpose, after which so much HCl/EtOH is added to the solution with constant stirring that no more precipitate forms. The crystals formed in ether are filtered off and washed with ether. The HCl salt is recrystallised from ethanol. Melting point: 258–260° C.

Elementary analysis gave the following result.—
Calculated (percent): H, 6.68; C, 68.23; N, 8.84; Cl, 11.19. Found (percent): H, 6.77; C, 68.29; N, 8.88; Cl, 11.11.

In the same manner the following substances are obtained by the methods described in I(d), (e) and (f);

5 N,N-dimethylaminoacetyl-5,6-dihydro-6-methylphenanthridine (M.P. 216–218) and
5 N-isopropylaminoacetyl-5,6-dihydro-6-methylphenanthridine (M.P. 220–222).

EXAMPLE II (a) Preparation 5,6-dihydro-6-ethylphenanthridine

To a mixture of 125 ml. THF and 9 gm. LiAl$_4$ is added 17 gm. ethylphenanthridine dissolved in 125 ml. THF. Then the solution is treated by the method described in Example I(c). The residue is filtered off and evaporated to dryness, after which it is immediately processed further.

(b) Preparation 5-N-methylaminoacetyl-5,6-dihydro-6-ethylphenanthridine

Nine grams 5,6-dihydro-6-ethylphenanthridine is dissolved in 50 ml. dry benzene, after which the solution is reacted with chloroacetyl chloride by the method described in Example I(d). The oil obtained is immediately processed further by reacting it with methylamine is accordance with Example I(e). Melting point of the HCl salt: 250–252° C.

(c) Preparation 5-N-methylaminoethyl-5,6-dihydro-6-ethylphenanthrdiine.HCl

N-methylaminoacetyl-6-ethylphenanthridine (7.5 gm.) and 300 ml. anhydrous tetrahydrofuran are passed into a three-necked flask fitted with stirrer, cooler and gas inlet tube. The mixture is heated to room temperature. Then diboran taken up in a dry nitrogen current is bubbled through the mixture. The required quantity of diboran is obtained by adding a solution of 36.5 ml. boron trifluoride-etherate in 7.7. ml. dimethoxy-diethyl ether to a suspension of 8.5 gm. sodium borohydride in 32.5 ml. dimethoxy-diethyl ether, while stirring. Then the mixture is refluxed for 1 hour in a nitrogen current and cooled down. Then 30 ml. absolute alcohol is added, after which the mixture is evaporated to dryness in vacuo. The residue is taken up in 120 ml. 6 N HCl. The mixture is heated for 15 minutes on a steam bath and then cooled down. The liquid is rendered alkaline with a solution of concentrated NaOH and extracted with ether. Then the extract is washed and dried on Na$_2$SO$_4$ and then evaporated. The resulting oil is dissolved in ether, after which so much HCl/EtOH is added with constant stirring till no more precipitate forms. The mixture is filtered off and the crystals washed with ether. The resulting HCl salt is recrystallised further from ethanol. Melting point: 251–253° C.

(d) In the same manner N-methylaminoacetyl-5,6-dihydro-6-methylphenanthridine is reduced and converted into the HCl salt. Melting point: 257–260° C.

EXAMPLE III (a) Preparation of 6-hydroxymethyl-5,6-dihydrophenanthridine

Eight grams 6-hydroxymethylphenanthridine, obtained from O-biphenyl-amine and hydroxy-acetyl chloride in accordance with Example I(a) and (b), is added to THF. Then a suspension of 25 mg. Adams catalyst in THF is added to the mixture. The reaction is performed in a three-necked flask fitted with stirrer, gas inlet tube and a U/shaped tube filled with ether.

The flask is put under hydrogen pressure, after which the cylinder of hydrogen is closed. The reaction is performed at room temperature with constant stirring. The proceeding of the reduction can be followed by means of the rise of the ether column in the U-tube. The reaction is complete if no further rise is seen. The flask will have to be put under hydrogen pressure a few times more dependent upon the quantity of substance to be reduced and the size of the apparatus. After completion of the reaction filtration takes place, after which the THF is removed by evaporation in vacuo. The residue is used without further purification. Yield: about 98%.

(b) Preparation 5-N-chloroacetyl-6-hydroxymethyl-5,6-dihydrophenanthridine

Eight grams 6-hydroxymethyl-5,6-dihydrophenanthridine is dissolved in 200 ml. benzene, after which 150 ml. water is added. The 40 ml. 2 N NaOH and 8 ml. chloroacetyl chloride are added dropwise simultaneously from 2 separating funnels, while stirring vigorously and continuously. The pH of the reaction mixture should always be kept between 9 and 11. The whole process takes about 1 hour. After that the mixture is stirred for another hour, whereupon the benzene layer is separated, washed with water, dried on sodium sulphate and evaporated to obtain 6 gm. of a yellow oil.

(c) Preparation N-methylaminoacetyl-6-hydroxymethyl-5,6-dihydrophenanthridine

The residue of the above process (about 6 gm.) is converted in the same manner as described in Example I(e) with a solution of methylamine in methanol (40%). The ether extracts obtained are evaporated to dryness and immediately processed further.

(d) Preparation of 5-N-methylaminoacetyl-6-chloromethyl-5,6-dihydrophenanthridine The residue of the preceding process (about 5 gm.) is passed into a two-necked flask fitted with a reflux cooler and separating funnel, after which 30 ml. THF is added and the mixture is brought to boiling temperature. While the mixture is being refluxed thionyl chloride (20 ml.) is added dropwise from a separating funnel. After the addition of the thionyl chloride the reaction mixture is refluxed for about 1 hour, after which the excess of thionyl chloride is removed by distillation in vacuo. Water and 2-N-NaOH are added, after which the free base is extracted with ether. After having been dried on Na$_2$SO$_4$ the substance is evaporated to dryness in vacuo and directly converted into the HCl salt by the method described in Example I(f). Th HCl salt of 5-N-methylaminoacetyl-6-chloromethyl-5,6-dihydrophenanthridine has a melting point of 238–240° C.

EXAMPLE IV (a) Preparation 2-bromo-6-methyl-5,6-dihydrophenanthridine

LiAlH$_4$ (2.4 gm.) is suspended in 250 ml. dry ether in a Soxhlet's apparatus, after which 9.8 gm. 2-bromo-6-methylphenanthridine is added to the suspension. The mixture is refluxed for 24 hours and then cooled down. The excess of LiAlH$_4$ is destroyed by stirring the mixture at room temperature for about half an hour. Then the reaction mixture is filtered off and the ether removed by evaporation in vacuo, after which the residue is immediately processed further. The residue is tested for purity by means of thin-layer chromatography (mobile liquid Be:EtOAc 8:2; colour reagent Dragendorff).

(b) The evaporated filtrate obtained in the previous process is dissolved in 200 ml. benzene and 13 ml. pyridine. The mixture is cooled down to about 8° C., after which 12 ml. chloroacetyl chloride is added dropwise and the mixture is treated further as described in Example I(d). After removal of the benzene by evaporation 10.2 gm. brack-brown oil is obtained which proves to be a mixture according to a thin-layer chromatogram.

The black-brown oil is transferred to an SiO$_2$ column and then eluted with benzene. The good fraction is collected, after which the benzene is removed by evaporation in vacuo. There remains 7.5 gm. light-yellow oil, which immdiately crystallises when some ether is added. Yield after filtration and recrystallisation in a mixture of EtOH:hexane 1:3 7.0 gm. pure substance. Melting point: 103.5–106° C. Toal yield IV(a) and (b): 59%.

(c) Preparation 2-bromo-6-methyl-5-N-methylamino-acetyl-5,6-dihydrophenanthridine.HCl Six grams of the subsance obtained in the previous step is dissolved in 180 ml. MeOH, after which the solution is processed further as described in Example I(e) and (f). Yield: 89%. Melting point of the HCl salt: 263.5–266.5° C.

(d) In the same manner 2-methoxy-6-methyl-5-N-methylaminoacetyl-5,6-dihydrophenanthridine. HCl has been prepared. Melting point: 252–254° C.

EXAMPLE V (a) Preparation 6-methoxymethyl-phenanthridine 6-chloromethyl-phenanthridine (11.4 gm.) in methanol, obtained for example from O-biphenylamine and chloroacetyl chloride, is passed to a three-nicked flask fitted with a thermometer, reflux cooler and mechanic stirrer, after which a solution of sodium methanolate in methanol (1.15 gm. Na in 10 ml. absolute methanol) is added with constant stirring. The mixture is maintained at a temperature of 60–62° C. while stirring. Care should be taken that the temperature does not rise. After cooling down enough water is added to dissolve the precipitate of NaCl, after which the mixture is extracted with ether. The ether extracts are washed and dried on $Na_2SO_4$, after which the ether is removed by evaporation. Melting point: 76–78° C. Yield: 98%.

(b) Preparation 5,6-dihydro-6-methoxymethyl-phenanthridine

The substance obtained by the preceding treatment is reduced in the manner described in Example III(a). Melting point: 107–108° C. Yield: 98%.

(c) Preparation 5-N-chloroacetyl-5,6-dihydro-6-methoxymethyl-phenanthridine

The compound obtained in Example V(b) is reacted with chloroacetyl chloride by the method described in Example I(d).

(d) Preparation 5-N-methylaminoacetyl-5,6-dihydro-6-methoxymethyl-phenanthridine The substance obtained in the previous step is condensed with methylamine in the manner described in Example I(e) and immediately converted into the HCl-salt. Melting point: 230–231° C. Yield: 87%.

EXAMPLE VI

Preparation 5-N-morpholinoacetyl-5,6-dihydro-6-methyl-phenanthridine

N-chloroacetyl-5,6-dihydro-6-methyl-phenanthridine (13.5 gm., Example I(d)) is reacted with 20 ml. morpholine by the method described in Example I(e), after which the compound obtained is converted into the HCl-salt. Melting point: 248–249° C.

EXAMPLE VII (a) Preparation 5-N-α-chloropropionyl-5,6-dihydro-6-methylphenanthridine 5,6-dihydro-6-methyl-phenanthridine is reacted with α-chloropropionyl chloride by the method described in Example I(d). The oil obtained is directly processed further.

(b) Preparation 5-N-α-methylaminopropionyl-5,6-dihydro-6-methyl-phenanthridine.HCl The oil obtained in the previous step is converted into the above compound by the method described in Examples I(e) and I(f).

EXAMPLE VIII (a) 6-phenanthridine-carboxylic acid methylester $SOCl_2$ (50 ml.) is added slowly to 1 ltr. methanol, p.a., maintaining the temperature between −15° and −25° C. Then 100 gm. 6-phenanthridine-carboxylic acid obtained by hydrolysis of the corresponding cyano compound, is added. Then the suspension is refluxed for 20 hours, filtered and evaporated to dryness. The residue is taken up in ether and extracted with 200 ml. 0.5 N NaOH (twice) and then washed with water. The ether is removed by evaporation and the residue dissolved in benzene while heating. Filter and allow to crystallise by means of a little petroleum ether. Melting point: 95–97° C.

(b) Preparation 5,6-dihydro-6-hydroxymethyl-phenanthridine

Eighty grams of the methyl ester obtained under (a) is dissolved in 300 ml. dry THF, after which a suspension of 39 gm. $LiAlH_4$ in 800 ml. THF is added. Then the mixture is refluxed for 5 hours, after which 160 ml. water are added gently while cooling in ice. Then the mixture is stirred for 1 hour at room temperature. The precipitate is removed by filtration and the filtrate evaporated to dryness, after which the residue is taken up in warm benzene. After recrystallisation the crystals are collected. Melting point: 103.5–105.5° C.

(c) Preparation 5,6-dihydro-5-N-chloroacetyl-6-hydroxymethyl-phenanthridine

The substance obtained in (b) is converted into the corresponding 5-N-chloroacetyl compound by means of chloroacetyl chloride by the method of Example III(b). The dark-red oil obtained is immediately processed further.

(d) 5,6-dihydro-5-N-chloroacetyl-6-chloromethyl-phenanthridine

The oil obtained in the previous step is dissolved in 1.5 ltr. benzene, after which 200 ml. $SOCl_2$ is added. The mixture is heated for 4 hours on a steam bath, after which it is cooled down and evaporated to dryness. The residue is dissolved in 200 ml. benzene and chromatographed over $SiO_2$, after which the benzene is removed by evaporation. The residue is recrystallised from alcohol. Melting point: 115–117° C.

(e) 5,6-dihydro-5-N-methylaminoacetyl-6-chloromethyl-phenanthridine.HCl

Eight grams of the dichloride is dissolved in 200 ml. methanol, p.a., and further converted in a solution of methylamine in methanol in accordance with Example I(e), after which the substance obtained is converted into the HCl-salt in accordance with Example I(f). Melting point: 239–240° C.

(f) In the same manner 5,6-dihydro-5-dimethylaminoacetyl-6-chloromethylphenanthridine has been prepared. Melting point of the HCl-salt: 227–229° C.

EXAMPLE IX (a) Preparation 5-N-β-cyanopropionyl-5,6-dihydro-6-ethyl-phenanthridine Five grams 5,6-dihydro-6-ethyl-phenanthridine (Example II(a) is reacted with β-cyanopropionyl chloride by the method described in Example I(d). The oil obtained is immediately processed further.

(b) Preparation 5-N-aminopropyl)-5,6-dihydro-6-ethyl-phenanthridine.HCl

The oil obtained in the previous step is reduced with diboran by the method described in Example II(c) and immediately converted into the HCl-salt.

EXAMPLE X

Preparation 5-N-dimethylaminoacetyl-5,6-dihydro-6-ethyl-phenanthridine 5,6-dihydro-6-ethyl-phenanthridine (10.5 gm.) is dissolved in 50 ml. dry benzene, after which 5.1 gm. dimethylamino-acetic acid and 10.55 m. dicyclohexyl carbodiimide is added. The mixture is refluxed for 2 hours and cooled down, after which filtration takes place. The mixture is left to stand for 2 hours at room temperature, after which any precipitate formed is filtered off (the precipitate is dicyclohexyl ureum). The reaction mixture is evaporated to dryness in vacuo and the residue chromatographed over a column of silicagel.

The dimethylaminoacetyl product obtained is converted into the HCl-salt by the method described in I(f).

What is claimed is:

1. A compound of the formula:

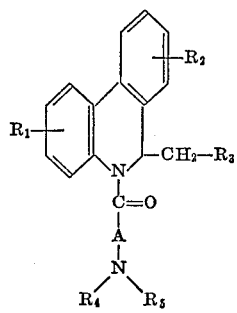

and pharmaceutically acceptable acid addition salts thereof, in which $R_1$, $R_2$ and $R_3$ are selected from the group consisting of hydrogen, halogen, alkyl with 1–6 carbon atoms and alkoxy with 1–6 carbon atoms; A is branched or unbranched alkylene with 1–6 carbon atoms; and $R_4$ and $R_5$ are selected from the group consisting of hydrogen and alkyl with 1–6 carbon atoms, and together, in combination with the nitrogen atom, morpholino.

2. 5,6 - dihydro-5-N-methylaminoacetyl - 6 - chloromethyl-phenanthridine.

References Cited

UNITED STATES PATENTS

| | | | |
|---|---|---|---|
| 3,336,293 | 8/1967 | Cusic et al. | 260—286 X |
| 3,489,745 | 1/1970 | Cusic et al. | 260—286 X |
| 3,534,041 | 10/1970 | Van Der Burg et al. | 260—286 X |
| 3,567,727 | 3/1971 | Barber | 260—286 X |

FOREIGN PATENTS

| | | | |
|---|---|---|---|
| 610,915 | 10/1948 | Great Britain | 260—286 X |

OTHER REFERENCES

Werner et al.: Jour. Med. Chem., vol. 10, pp. 575–6 (1967).

DONALD G. DAUS, Primary Examiner

U.S. Cl. X.R.

260—247.2, 268 TR, 283 SY, 283 CN, 283 R, 286 A, 289 R; 424—258, 250, 248